US012266960B2

(12) United States Patent
Truettner

(10) Patent No.: US 12,266,960 B2
(45) Date of Patent: *Apr. 1, 2025

(54) MULTI-BAY CHARGER WITH POWER MONITORING BASED ON AVAILABLE POWER FROM A POWER SOURCE

(71) Applicant: MILWAUKEE ELECTRIC TOOL CORPORATION, Brookfield, WI (US)

(72) Inventor: Donald J. Truettner, Waukesha, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 713 days.

This patent is subject to a terminal disclaimer.

(21) Appl. No.: 17/504,798

(22) Filed: Oct. 19, 2021

(65) Prior Publication Data

US 2022/0123567 A1 Apr. 21, 2022

Related U.S. Application Data

(60) Provisional application No. 63/093,560, filed on Oct. 19, 2020.

(51) Int. Cl.
*H02J 7/00* (2006.01)
*H02J 7/02* (2016.01)
(52) U.S. Cl.
CPC ........ *H02J 7/0042* (2013.01); *H02J 7/00032* (2020.01); *H02J 7/0013* (2013.01); *H02J 7/00712* (2020.01); *H02J 7/02* (2013.01)
(58) Field of Classification Search
CPC .................................................. H02J 7/0042
(Continued)

(56) References Cited

U.S. PATENT DOCUMENTS 5,659,465 A 8/1997 Flack et al.
10,170,908 B1 1/2019 Catalano et al.
(Continued)

FOREIGN PATENT DOCUMENTS

JP 4753100 B2 8/2011
KR 19990055989 A 7/1999

OTHER PUBLICATIONS

International Search Report and Written Opinion for Application No. PCT/US2021/055524 dated Feb. 16, 2022 (10 pages).
(Continued)

*Primary Examiner* — Yalkew Fantu
(74) *Attorney, Agent, or Firm* — Michael Best & Friedrich LLP

(57) ABSTRACT

A battery pack charger that includes a housing and a plurality of battery receptacles supported by the housing that are configured to receive a battery pack. The charger includes a plurality of charging circuits connected to the battery receptacles and configured to transmit power to the plurality of battery receptacles. The charger includes at least one sensor to sense available power from a power source. The charger includes a controller operable to receive a signal from the at least one sensor indicative of the available power from the power source, receive signals from the plurality of charging circuits indicative of an amount of power needed by the charging circuits to charge the battery packs, and reduce a charging power to at least one of the plurality of charging circuits when the amount of power needed by the charging circuits is greater than the available power from the power source.

20 Claims, 8 Drawing Sheets

(58) Field of Classification Search
USPC .......................................................... 320/113
See application file for complete search history.

(56) References Cited

U.S. PATENT DOCUMENTS

| | | |
|---|---|---|
| 2001/0020838 A1 | 9/2001 | Malackowski |
| 2011/0121783 A1* | 5/2011 | Boyles ................. H02J 7/0013 |
| | | 320/113 |
| 2016/0094067 A1 | 3/2016 | Li |
| 2017/0036114 A1* | 2/2017 | Boncyk .............. H04N 21/8173 |
| 2019/0058339 A1 | 2/2019 | Sergyeyenko |
| 2021/0143655 A1* | 5/2021 | Truettner ............ H02J 7/00045 |
| 2023/0097967 A1* | 3/2023 | Saboury ............. H01M 10/441 |
| | | 320/113 |

OTHER PUBLICATIONS

Extended European Search Report for Application No. 21883661.7 dated Dec. 18, 2024 (11 pages).

* cited by examiner

MULTI-BAY CHARGER WITH POWER MONITORING BASED ON AVAILABLE POWER FROM A POWER SOURCE

RELATED APPLICATIONS

This application claims the benefit of U.S. Provisional Patent Application No. 63/093,560, filed Oct. 19, 2020, the entire content of which is hereby incorporated by reference.

BACKGROUND

Portable power tools are typically cordless and receive power from power tool battery packs.

SUMMARY

In order to maximize work time when using a cordless power tool, it is important to have a readily available supply of charged battery packs. Multi-bay battery pack chargers allow for multiple battery packs to be charged simultaneously. However, multi-bay battery pack chargers run the risk of overdrawing power from a power source when supplying power to multiple battery packs. To avoid overdrawing power from a power source, power monitoring techniques and designs can be implemented.

Conventional multi-bay battery pack chargers have several drawbacks. When the power drawn by a multitude of charging bays exceeds the power available from the power source, a circuit protection device can be activated to remove power from one or more of the charging bays. For example, if the power needed by charging circuits within the multi-bay battery pack charger exceeds the power available, then certain battery packs being charged by the multi-bay battery pack will cease to receive power. It would be advantageous to implement a controller for power monitoring in order to optimize charging of as many battery packs at one time as possible. As a result, multiple battery packs can be charged simultaneously without the circuit protection device being activated that would prevent the charging of one or more battery packs. Rather, the controller can determine the power needed for charging from the individual charging bays and compare the power needed for charging to the power available for charging. The controller can then determine how much power to provide to the individual charging bays based on the comparison of the power needed to the power available.

Embodiments described herein provide a battery pack charger for a device, such as a power tool battery pack. The battery pack charger includes a housing. The battery pack charger further includes a plurality of battery pack receptacles supported by the housing that are configured to receive a battery pack. The battery pack charger further includes a plurality of charging circuits connected to the battery pack receptacles and configured to transmit power to at least one of the plurality of battery pack receptacles. The battery pack charger further includes at least one sensor (e.g., a voltage sensor, a current sensor, etc.) to sense available power from a power source. The battery pack further includes a controller operable to receive a signal from the at least one sensor indicative of the available power from the power source, receive signals from the plurality of charging circuits, the signals from the plurality of charging circuits being indicative of an amount of power needed by the plurality of charging circuits to charge the battery packs, and reduce a charging power to at least one of the plurality of charging circuits when the amount of power needed by the plurality of charging circuits is greater than the available power from the power source.

Embodiments described herein provide a method for optimizing charging power. The method includes determining an available power based at least on one of an available line current and an available line voltage. The available line current and the available voltage are associated with a power source. The method further includes receiving signals from a plurality of charging circuits, each of the signals from the plurality of charging circuits being indicative of an amount of power needed by the plurality of charging circuits to charge battery packs electrically coupled to the plurality of charging circuits. The method additionally includes reducing, in response to the power needed by the plurality of charging circuits being greater than the available power, a charging power to at least one of the plurality of charging circuits.

Embodiments described herein provide a system for charging battery packs. The system includes a plurality of battery packs and a battery pack charger. The battery pack charger includes a plurality of battery pack receptacles. Each battery pack receptacle is configured to receive one of the plurality of battery packs. A plurality of charging circuits are electrically connected to the battery pack receptacles. A controller is operable to receive a signal from at least one sensor indicative of the available power from a power source, receive signals from the plurality of charging circuits, the signals from the plurality of charging circuits being indicative of an amount of power needed by the plurality of charging circuits to charge the plurality of battery packs, and reduce a charging power to at least one of the plurality of charging circuits when the amount of power needed by the plurality of charging circuits is greater than the available power from the power source.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein relate to a battery pack charger. The battery pack charger includes a housing. The battery pack charger further includes a plurality of battery receptacles supported by the housing that are configured to receive a battery pack. The battery pack charger further includes a plurality of charging circuits connected to the battery receptacles and configured to transmit power to at least one of the plurality of battery receptacles. The battery pack charger further includes a sensor (e.g., a voltage sensor, a current sensor, etc.) to sense available power from a power source. The battery pack further includes a controller operable to receive a signal from the sensor indicative of the available power from the power source, receive signals from the plurality of charging circuits, the signals from the plurality of charging circuits being indicative of an amount of power needed by the charging circuits to charge the battery packs, and reduce a charging power to at least one of the plurality of charging circuits when the amount of power needed by the charging circuits is greater than the available power from the power source.

Figure 1:
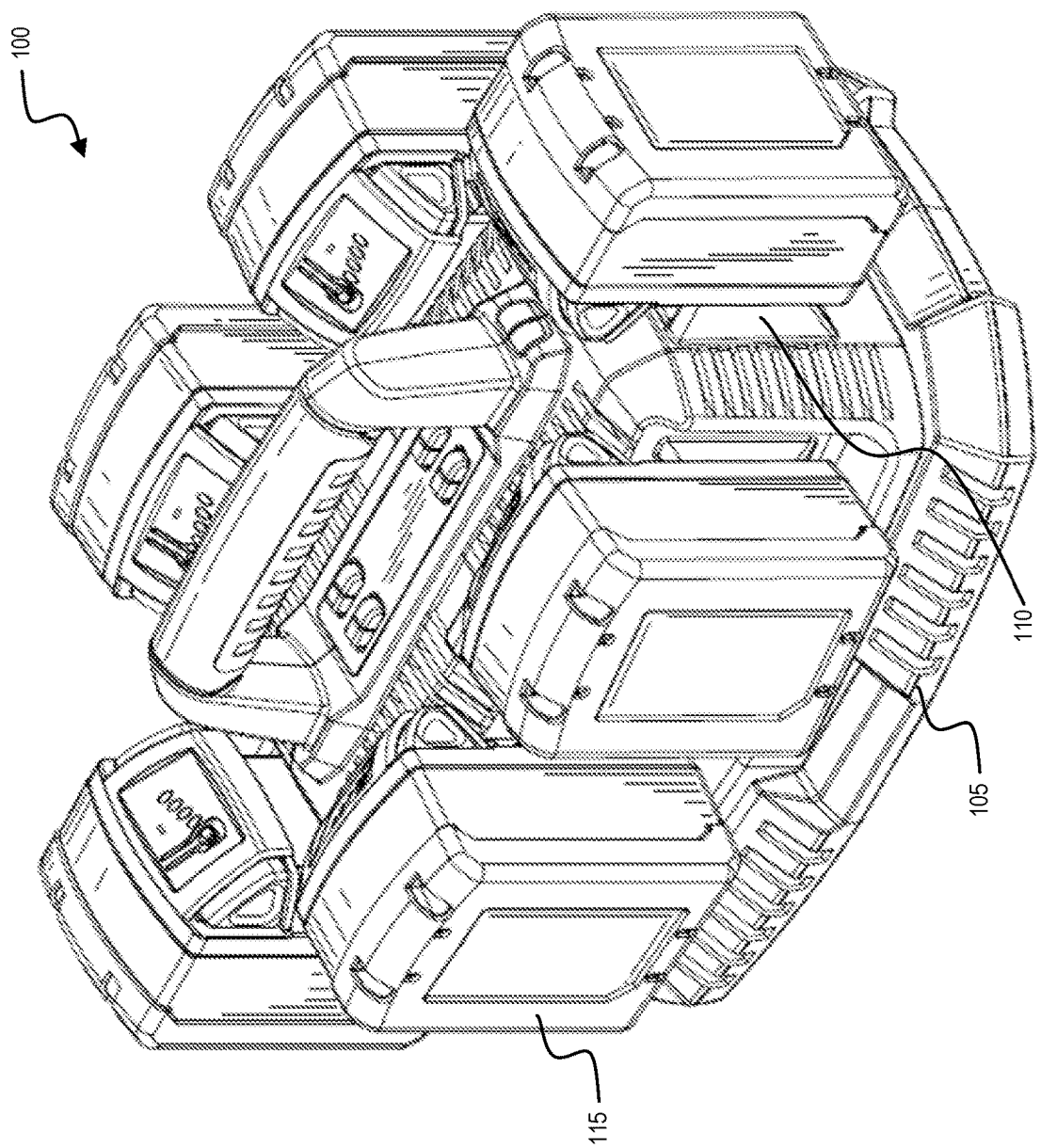
FIG. 1 illustrates a multi-bay battery pack charger, according to embodiments described herein.

FIG. 1 illustrates a multi-bay battery pack charger 100. The multi-bay battery pack charger ("charger") 100 includes a housing 105 and battery receptacles 110 for receiving battery packs 115. The charger 100 is configured to distribute power to the battery packs 115. The battery packs 115 are configured to provide power to peripheral devices. The peripheral devices may be handheld power tool or the like. The charger 100 is also configured to receive power from a power source and use the power from the power source to distribute charging power to the battery packs 115. In some embodiments, the power source is a DC power source, for example, a photovoltaic cell (e.g., a solar panel) or one or more batteries. In other embodiments, the power source is an AC power source, for example, a conventional wall outlet.

The battery receptacles 110 are positioned on the exterior of the housing 105 and are configured to receive the battery packs 115. In the illustrated embodiment, the battery packs 115 are slide-on style battery packs. Accordingly, the battery receptacles 110 include guide rails to receive the slide-on style battery packs and latching mechanisms to secure the two components together. In the illustrated embodiment, the battery packs 115 are 18 Volt battery packs having a lithium-based chemistry. However, the battery packs 115 may also be 6 Volt battery packs, 12 Volt battery packs, 24 Volt battery packs, 40 Volt battery packs, 80 Volt battery packs, or another value between 6 Volts and 120V, and having a lithium-based chemistry.

Figure 2:
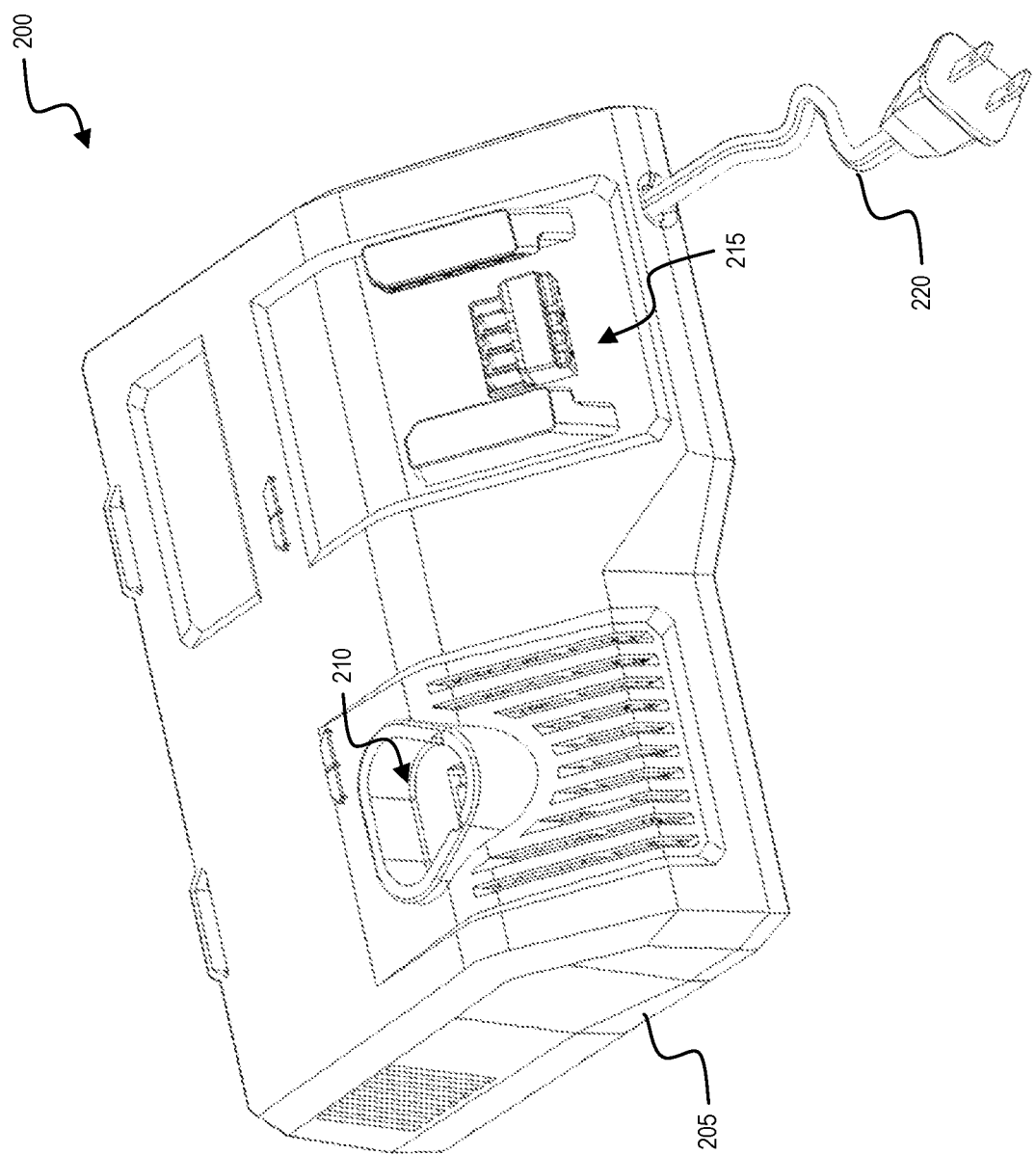
FIG. 2 illustrates a multi-bay battery pack charger, according to embodiments described herein.

FIG. 2 illustrates a battery pack charger 200. The battery pack charger 200 includes a housing 205, interface portions 210, 215, and a cord 220. The interface portions 210, 215 electrically connect the battery pack charger 200 to one or more battery packs (e.g., battery pack 115) through charging circuits. For example, a charging circuit provides power to a battery pack from a power input circuit that is powered by a power source (see FIG. 4). The cord 220 allows the battery pack charger 200 to receive power from an external power source (e.g., a conventional wall outlet).

Figure 3:
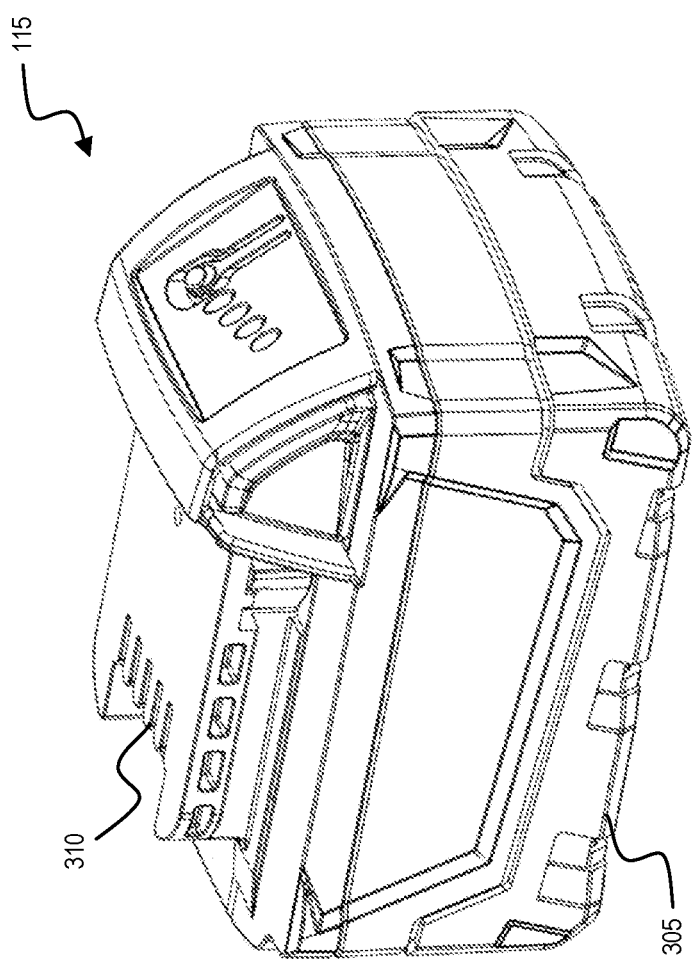
FIG. 3 illustrates a battery pack, according to embodiments described herein.

FIG. 3 illustrates a battery pack 115 that is configured to receive power from the charger 100, 200. The battery pack 115 includes a housing 305 and an interface portion 310 for connecting the battery pack 115 to a device (e.g., a power tool) or a battery pack charger (e.g., charger 100, 200).

Figure 4:
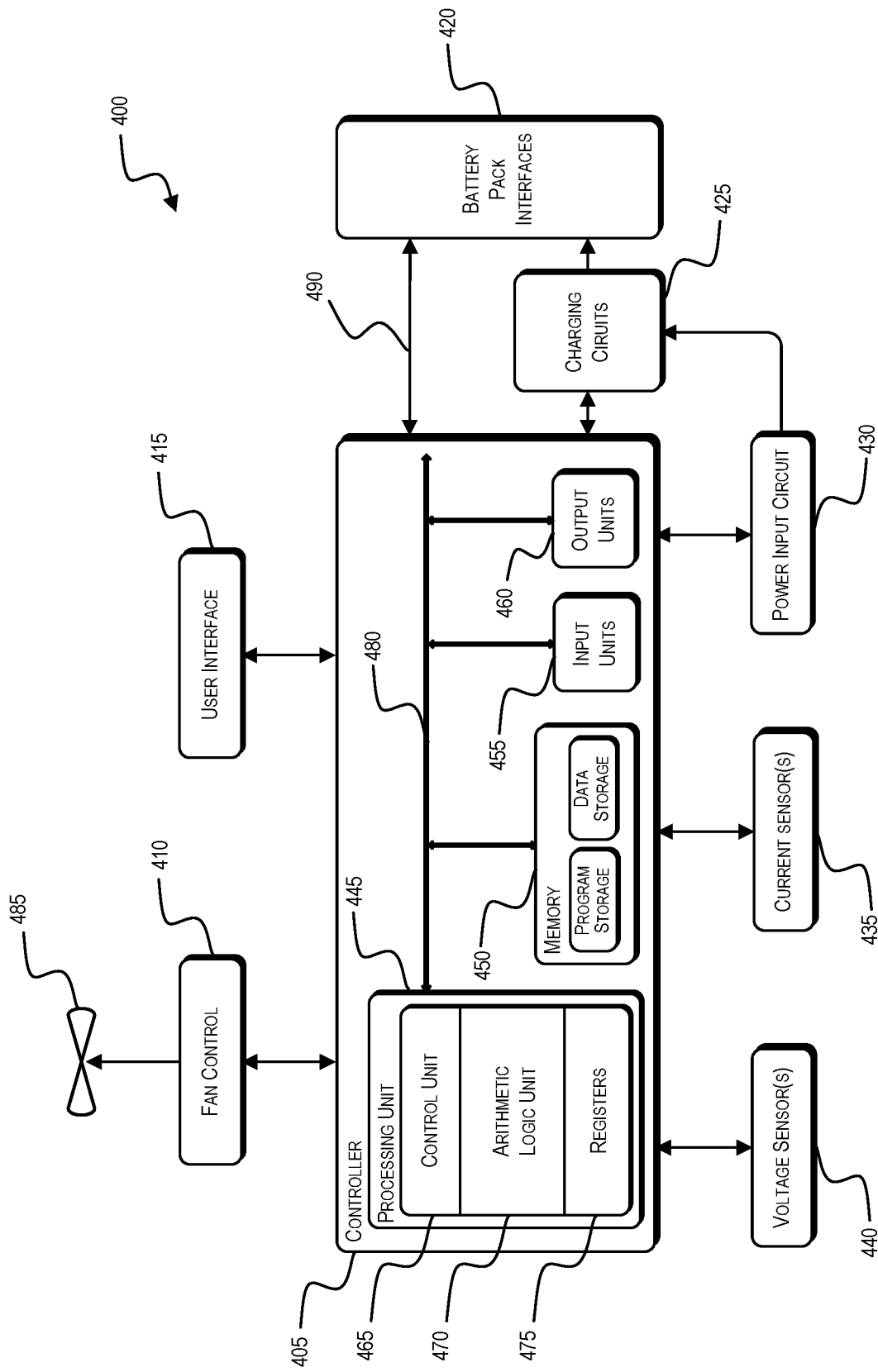
FIG. 4 illustrates a control system for the multi-bay battery pack charger of FIG. 1 or FIG. 2, according to embodiments described herein.

FIG. 4 illustrates a control system 400 for the charger 100, 200. The control system includes a controller 405. The controller 405 is electrically and/or communicatively connected to a variety of modules or components of the charger 100, 200. For example, the illustrated controller 405 is electrically connected to a fan control 410, a user interface 415, battery pack interfaces 420, charging circuits 425, a power input circuit 430, current sensors 435, and voltage sensors 440. The controller 405 includes combinations of hardware and software that are operable to, among other things, control the operation of the charger 100, 200. The fan control 410 operates a fan 485. In some embodiments, the user interface 415 includes a touchscreen. In some embodiments, the user interface 415 includes various components (e.g., switches, buttons, levers, dials, etc.) that allow a user to interface with and control the charger 100.

The controller 405 includes a plurality of electrical and electronic components that provide power, operational control, and protection to the components and modules within the controller 405 and/or charger 100, 200. For example, the controller 405 includes, among other things, a processing unit 445 (e.g., a microprocessor, a microcontroller, an electronic controller, an electronic processor, or another suitable programmable device), a memory 450, input units 455, and output units 460. The processing unit 445 includes, among other things, a control unit 465, an ALU 470, and a plurality of registers 475 (shown as a group of registers in FIG. 4), and is implemented using a known computer architecture (e.g., a modified Harvard architecture, a von Neumann architecture, etc.). The processing unit 445, the memory 450, the input units 455, and the output units 460, as well as the various modules or circuits connected to the controller 405 are connected by one or more control and/or data buses (e.g., common bus 480). The control and/or data buses are shown generally in FIG. 4 for illustrative purposes. The use of one or more control and/or data buses for the interconnection between and communication among the various modules, circuits, and components would be known to a person skilled in the art in view of the embodiments described herein.

The memory 450 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 445 is connected to the memory 450 and executes software instructions that are capable of being stored in a RAM of the memory 450 (e.g., during execution), a ROM of the memory 450 (e.g., on a generally permanent basis), or another non-transitory computer readable medium such as another memory or a disc. Software included in the implementation of the charger 100 can be stored in the memory 450 of the controller 405. The software includes, for example, firmware, one or more applications, program data, filters, rules, one or more program modules, and other executable instructions. The controller 405 is configured to retrieve from the memory 450 and execute, among other things, instructions related to the control processes and methods described herein. In other constructions, the controller 405 includes additional, fewer, or different components.

The battery pack interfaces 420 includes a combination of mechanical components (e.g., rails, grooves, latches, etc.) and electrical components (e.g., one or more terminals) configured to and operable for interfacing (e.g., mechanically, electrically, and communicatively connecting) the charger 100 with a battery pack (e.g., battery pack 115). For example, the battery pack interfaces 420 are configured to receive power through the charging circuits 425 via the power input circuit 430. The battery pack interfaces 420 are also configured to communicatively connect to the controller 405 via one or more communications lines 490.

The controller 405 is configured to control the transfer of power to the charging circuits 425 based on detected power conditions in the charger 100. For example, the current sensors 435 and the voltage sensors 440 communicate to the controller 405 the amount of current and voltage available in the charger 100, respectively. The individual charging circuits 425 communicate, to the controller, the amount of power needed by the battery packs 115 that are electrically connected to the respective charging circuits 425. The controller 405 is configured to detect an overpower condition (e.g., when the battery packs 115 collectively require more power than is available to the charger 100). If the controller 405 detects an over power condition while multiple battery packs 115 are being charged by the charger 100, the controller 405 reduces the amount of charge power available to at least one of the battery packs 115 (e.g., reduced to a non-zero power value).

Figure 5:
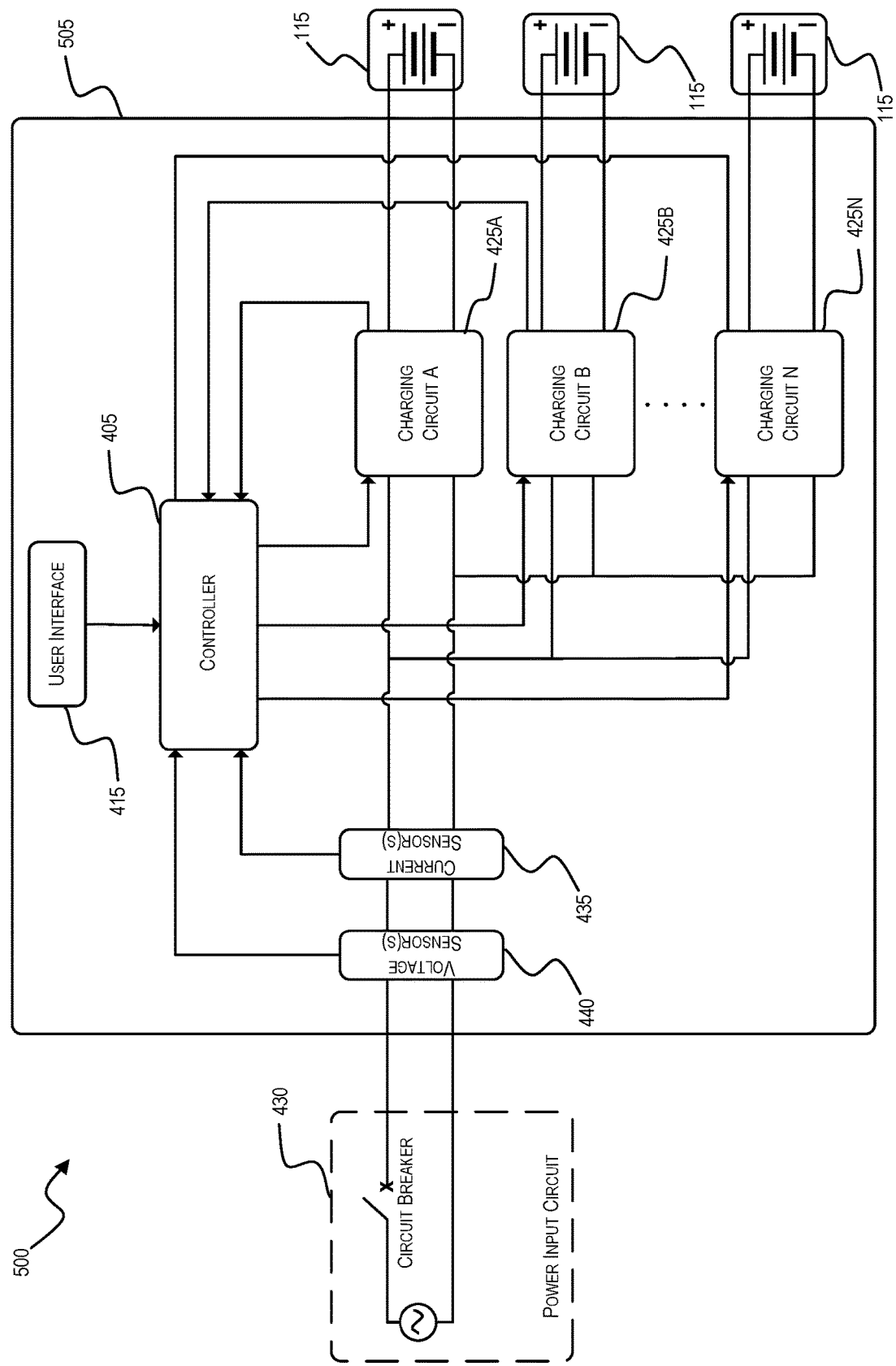
FIG. 5 illustrates a schematic diagram for the multi-bay battery pack charger of FIG. 1 or FIG. 2, according to embodiments described herein.

FIG. 5 illustrates a schematic diagram 500 of the charger 100 of FIG. 1 or charger 200 of FIG. 2. The schematic diagram 500 includes the power input circuit 430, a charging system 505, and a plurality of battery packs 115. The charging system 505 includes the controller 405, the user interface 415, individual charging circuits 425A-425N (N indicating an indeterminate number of potential charging circuits), the current sensors 435, and the voltage sensors 440. The power input circuit 430 provides power to the controller 405 and the charging circuits 425A-425N. The power input circuit 430 receives power from an external power source (e.g., a conventional wall outlet; one or more batteries, etc.) or an internal power source (e.g., one or more battery cells). In some embodiments, the power input circuit 430 includes a circuit breaker as branch circuit protection. In other embodiments, the power input circuit 430 includes a fuse, an overload relay, etc.

The controller 405 receives inputs from the user interface 415, the individual charging circuits 425A-425N, the current sensors 435, and the voltage sensors 440. The user interface 415 receives inputs from a user and communicates the inputs to the controller 405. For example, the user interface 415 may allow the user to indicate input conditions (e.g. a branch circuit protection level, a selection of which battery packs to charge, a charging priority level, etc.). An amount of power needed by each of the battery packs 115 is communicated to the controller 405 by the charging circuits 425 (e.g., based on information received from the battery packs 115 or information determined by the charging circuits 425). The current sensors 435 and voltage sensors 440 measure the current and voltage, respectively, from the power input circuit 430 and convert the measured values from the power input circuit 430 to usable signals (e.g. power available) received by the controller 405.

The controller 405 has outputs going to each individual charging circuit 425A-425N. The charging circuits 425A-425N include electronic circuits that take, for example, an input voltage and convert the input voltage to usable charging voltage to charge battery packs 115. The controller 405 determines the amount of power that will flow to the battery packs 115 based on the power available in the charger 100 and the power needed by the battery packs 115. The controller 405 communicates the determined amount of power to the charging circuits 425A-425N. The charging circuits 425A-425N output the communicated amount of power to the battery packs 115. The controller 405 is able to sense if, or receive an indication that, a battery pack 115 is removed from a charging circuit 425A-425N. The controller 405 can then terminate charging power to the affected charging circuit 425A-425N. For example, if the individual charging circuit 425A-425N is not electrically connected to a battery pack 115, then the controller 405 does not allow charging power to flow to the individual charging circuit 425A-425N, which allows for more power to be allocated to charging circuits 425A-425N that are electrically coupled to battery packs 115.

Figure 6:
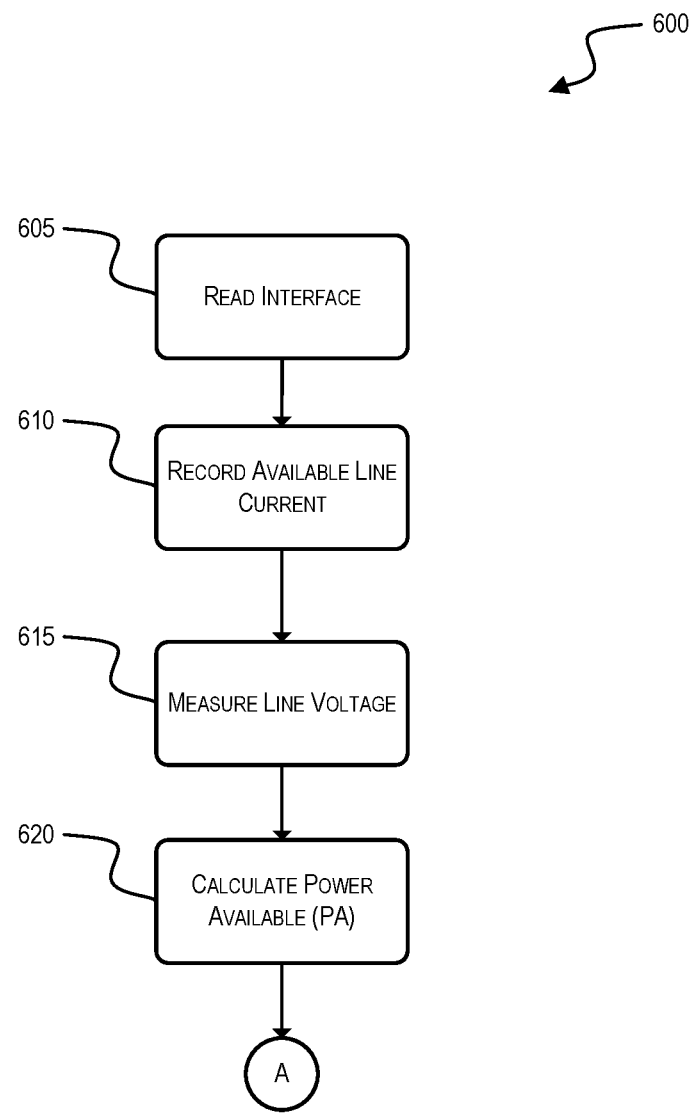
FIGS. 6, 7, and 8 are a process for monitoring power of charging battery packs, according to embodiments described herein.
Figure 7:
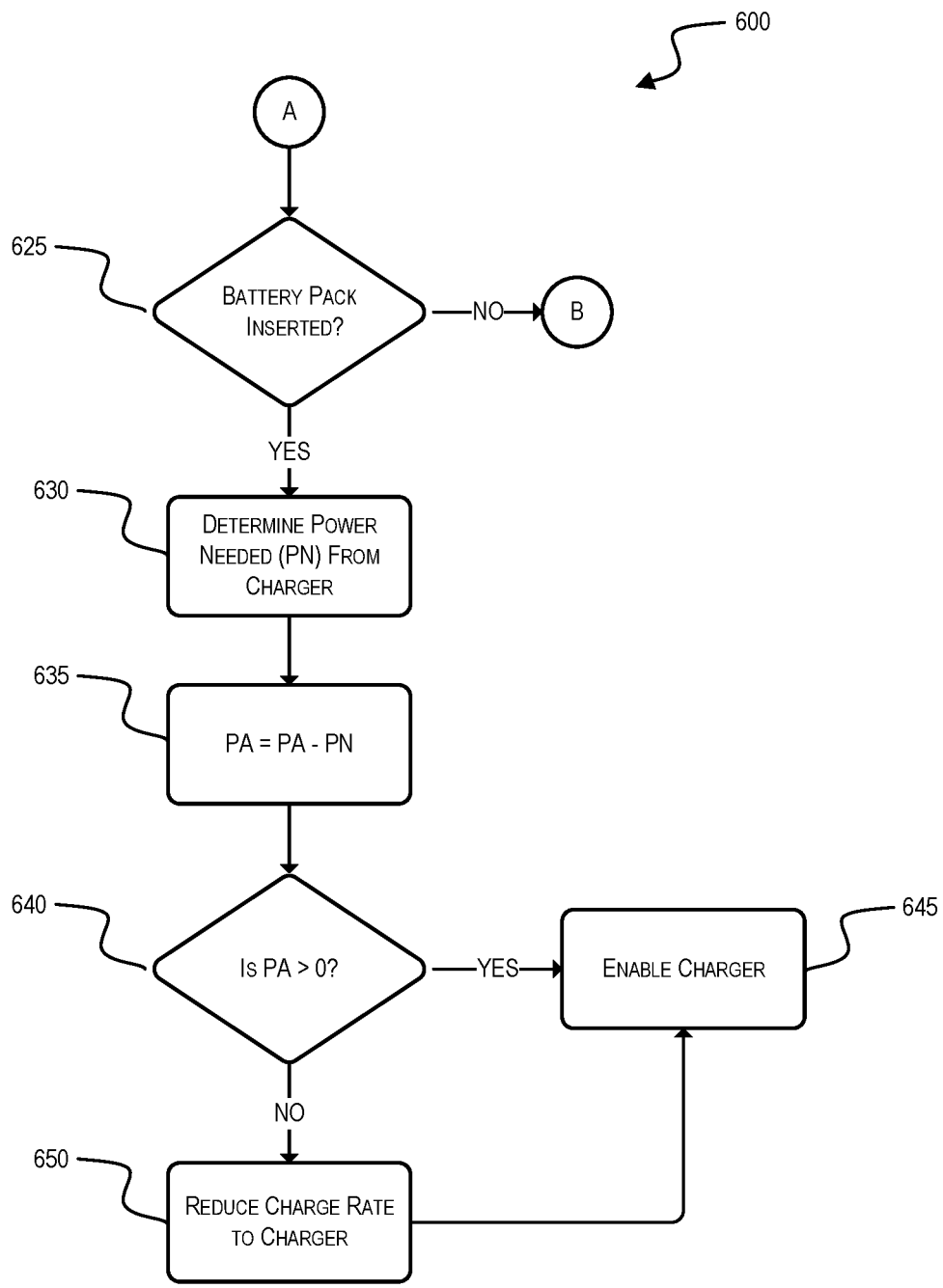
Figure 8:
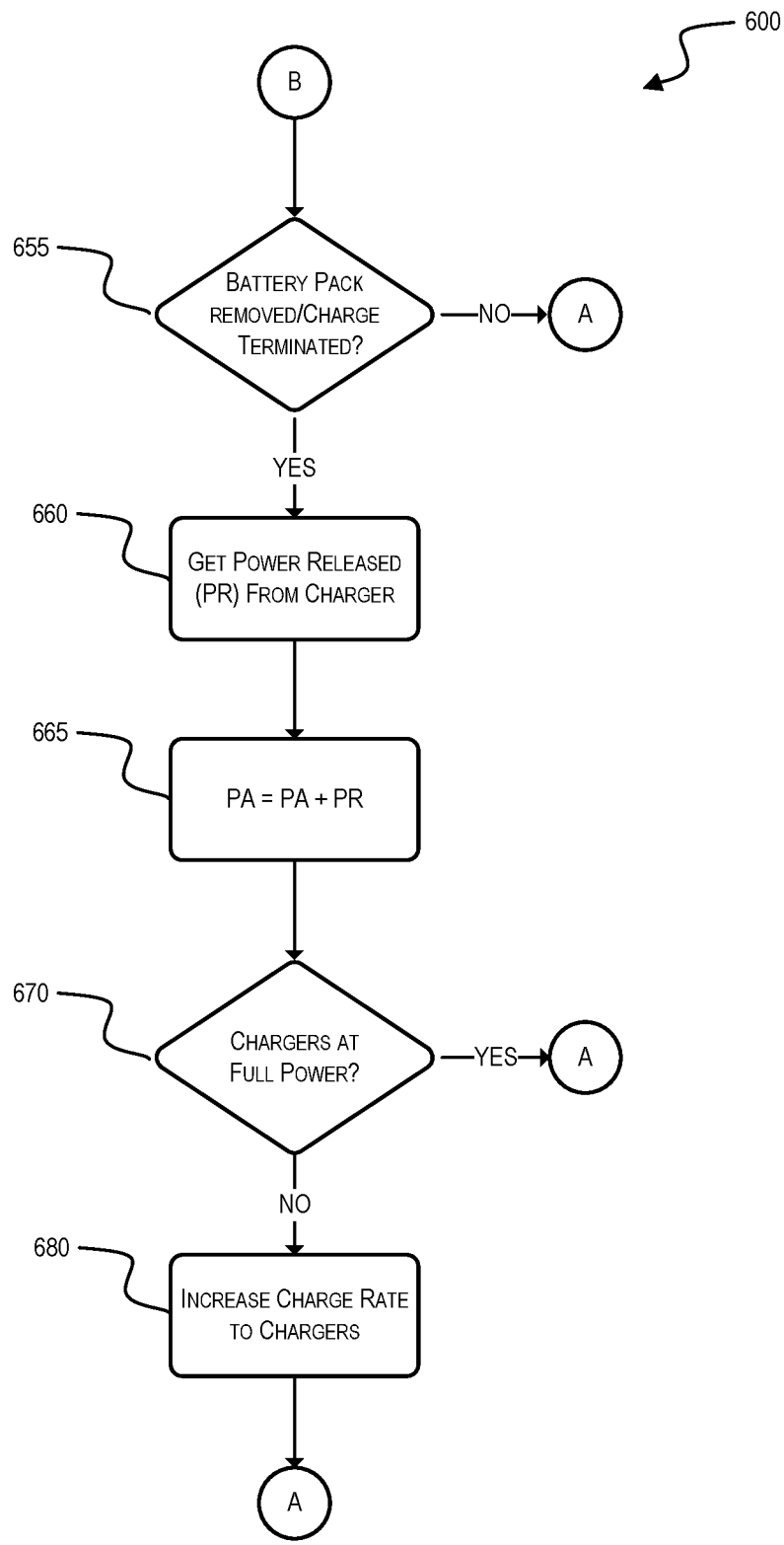

FIGS. 6, 7, and 8 are a process 600 for monitoring power for optimized charging in the charger 100 of FIG. 1 or charger 200 of FIG. 2. The process 600 begins with the controller 405 reading at least one input from the user interface 415 (Block 605). For example, the user interface 415 allows the user to indicate input conditions such as the branch circuit protection level to be used by the controller 405, which battery packs to charge, the charging priority level etc. After the user interface 415 is read, the available line current is stored or recorded (Block 610) and the line voltage is measured (Block 615). For example, the available line current and the line voltage are obtained by the controller 405 through the current sensors 435 and the voltage sensors 440, respectively. The line current and the line voltage is determined based on an input power supply (e.g., AC power from a wall outlet). Based on the input conditions from the user interface 415, the available line current, and the available line voltage, the Power Available (PA) is calculated (Block 620).

Following calculating the PA at Block 620, in FIG. 7 at Block 625, the controller 405 senses or communicates with the charging circuits 425A-425N to determine if a battery pack 115 has been inserted into a battery receptacle 110 and, thus, electrically coupled to one of the charging circuits 425A-425N. If, at Block 625, a battery pack 115 is determined to not have been inserted, the process 600 continues to Block 655 (shown in FIG. 8). If, at Block 625, a battery pack 115 is determined to have been inserted, the controller 405 queries one of the charging circuits 425A-425N to obtain or determine the Power Needed (PN) for the inserted battery pack 115 (Block 630). For example, one of the charging circuits 425A-425N may determine PN based on communication with the battery pack 115 that is electrically coupled to the respective one of the charging circuits 425A-425N. After the controller 405 receives the PN from one of the charging circuits 425A-425N, the controller 405 determines whether the PA is greater than the PN (Block 635). For example, the controller 405 can determine a difference between PA and PN by subtracting the value of PN from the PA to give a resultant PA to the charger 100 (Block 635).

In some embodiments, following the calculation of the resultant PA, the process 600 continues with the controller 405 determining if the resultant PA is greater than zero (Block 640). In other embodiments, the controller 405 determines if the resultant PA is greater than a predetermined or calculated non-zero value. If the resultant PA is determined, by the controller 405, to be greater than zero or the predetermined non-zero value, the one of the charging circuits 425A-425N is enabled to charge a battery pack (Block 645). If the resultant PA is determined to be less than zero or the predetermined non-zero value, the controller 405 requests that at least one of the charging circuits 425A-425N reduce the rate at which power is or will be flowing from the at least one of the charging circuits 425A-425N to the battery pack 115 (Block 650). For example, the controller 405 instructs one or more of the charging circuits 425A-425N to reduce the rate at which power is flowing from the charging circuits 425A-425N to the battery pack 115 so the value of PA stays above zero or the predetermined non-zero value (e.g., PA is greater than or equal to PN). In some embodiments, the charging rate of multiple charging circuits is reduced. The reductions in charging rate can be uniform for each charging circuit 425A-425N or non-uniform for each charging circuit 425A-425N (e.g., based on a capacity of the battery pack being charged, based on a charging priority level for the battery packs, based on an input received at the user interface, etc.).

If the controller determines that a battery pack has not been inserted at Block 625, then the process 600 proceeds to Block 655 of FIG. 8. At block 655 the controller 405 queries the charging circuits 425A-425N to determine if a battery pack 115 has been removed or if charging of a battery pack 115 by one of the charging circuits 425A-425N has been terminated. For example, an input received at the user interface 415 may terminate charging of a battery pack 115. If the controller 405 determines that a battery pack 115 has been removed or charge has been terminated to a battery pack 115 from one of the charging circuits 425A-425N, the controller 405 determines a Power Released (PR) from the one of the charging circuits 425A-425N (Block 660). The value PR is added back to PA to obtain a new PA (Block 665). The controller 405 queries the charging circuits 425A-425N to determine if the charging circuits 425A-425N are operating at full power (Block 670). For example, when operating at full power, the charging circuits 425A-425N are charging battery packs 115 at a maximum charging rate and the PA remains greater than or equal to zero or the predetermined non-zero value. In some embodiments, a maximum value for PA is input from the user interface 415 to the controller 405. In other embodiments, the maximum value for PA is determined by the controller 405.

If, at Block 670, all the charging circuits 425A-425N are operating at full power, then the controller 405 monitors the charging circuits 425A-425N for the insertion of battery packs 115 (Block 625). If, at Block 670, all the charging circuits 425A-425N are not operating at full power, the controller 405 communicates to the charging circuits 425A-425N to increase the rate of charge to the battery packs 115 up to the maximum charging rate for the battery packs 15 such that PA remains greater than or equal to zero or the predetermined non-zero value (Block 680). After the controller 405 adjusts the charge rates of the charging circuits 425A-425N, the controller 405 monitors the charging circuits 425A-425N for the insertion of a battery pack (Block 625). The process 600 proceeds from Block 625 as described above.

Although the blocks of process 600 are illustrated serially and in a particular order in FIGS. 6, 7, and 8, in some embodiments, one or more of the blocks are implemented in parallel, are implemented in a different order than shown, or are bypassed.

Thus, embodiments described herein provide, among other things, systems and methods for monitoring power for optimized charging in a multi-bay battery pack charger. Various features and advantages are set forth in the following claims.

What is claimed is:

1. A battery pack charger comprising:
   a housing;
   a plurality of battery pack receptacles supported by the housing, each of the plurality of battery pack receptacles configured to receive one of a plurality of battery packs;
   a plurality of charging circuits connected to the plurality of battery pack receptacles, each of the plurality of charging circuits configured to transmit power to at least one of the plurality of battery pack receptacles;
   at least one sensor configured to sense an available power from a power source; and
   a controller operable to:

receive a signal from the at least one sensor indicative of the available power from the power source, receive signals from the plurality of charging circuits, each of the signals from the plurality of charging circuits being indicative of an amount of power needed by the plurality of charging circuits to charge the plurality of battery packs, and reduce a charging power to at least one of the plurality of charging circuits when the amount of power needed by the plurality of charging circuits is greater than the available power from the power source.

2. The battery pack charger of claim 1, further comprising a second sensor configured to sense the available power from the power source.

3. The battery pack charger of claim 2, wherein the controller is further operable to:

receive a second signal from the second sensor further indicative of the available power from the power source.

4. The battery pack charger of claim 1, wherein the plurality of charging circuits are further configured to measure a power transmitted to at least one of the plurality of battery pack receptacles and provide the power transmitted to the controller.

5. The battery pack charger of claim 1, further comprising an interface configured to communicate with the controller and to receive an input.

6. The battery pack charger of claim 5, wherein the input is at least one of a branch circuit protection level, an election of at least one battery pack to charge, and a charging priority level.

7. The battery pack charger of claim 1, wherein the at least one first sensor is one of a voltage sensor or a current sensor.

8. The battery pack charger of claim 1, wherein the power source is an alternating current (AC) power source.

9. The battery pack charger of claim 1, wherein the controller is further operable to:

output, in response to the amount of power needed by the plurality of charging circuits being less than the available power from the power source, the charging power to the plurality of charging circuits to charge the plurality of battery packs.

10. The battery pack charger of claim 1, wherein the controller is further operable to:

determine that at least one battery pack has been removed from a corresponding battery pack receptacle;

receive at least one signal from a corresponding charging circuit indicative of an amount of power released;

determine a new available power, the new available power is the amount of power released in combination with the available power; and reallocate the new available power to the plurality of charging circuits that are charging the plurality of battery packs.

11. A method of optimizing charging power, the method comprising:

determining an available power based at least on one of an available line current and an available line voltage, the available line current and the available voltage associated with a power source;

receiving signals from a plurality of charging circuits, each of the signals from the plurality of charging circuits being indicative of an amount of power needed by the plurality of charging circuits to charge battery packs electrically coupled to the plurality of charging circuits; and reducing, in response to the amount of power needed by the plurality of charging circuits being greater than the available power, a charging power to at least one of the plurality of charging circuits.

12. The method of claim 11, further comprising:

outputting, in response to the amount of power needed by the plurality of charging circuits being less than the available power, the amount of power needed to at least one of the plurality of charging circuits.

13. The method of claim 11, wherein the charging power is non-uniformly reduced to each of the plurality of charging circuits.

14. The method of claim 11, further comprising:

determining that at least one battery pack has been removed from a corresponding battery pack receptacle;

receiving at least one signal from a corresponding charging circuit indicative of an amount of power released;

determining a new available power, the new available power is the amount of power released in combination with the available power; and reallocating the new available power to the plurality of charging circuits that are charging the battery packs.

15. The method of claim 11, further comprising:

querying the plurality of charging circuits to determine that the plurality of charging circuits are outputting a maximum power; and increasing, in response to at least one of the plurality of charging circuits not outputting the maximum power, the charging power to the at least one of the plurality of charging circuits.

16. A system for charging battery packs, the system comprising:

a plurality of battery packs; and a battery pack charger including a plurality of battery pack receptacles, each battery pack receptacle configured to receive one of the plurality of battery packs, a plurality of charging circuits electrically connected to the plurality of battery pack receptacles, and a controller operable to:

receive a signal from at least one sensor indicative of an available power from a power source, receive signals from the plurality of charging circuits, each of the signals from the plurality of charging circuits being indicative of an amount of power needed by the plurality of charging circuits to charge the plurality of battery packs, and reduce a charging power to at least one of the plurality of charging circuits when the amount of power needed by the plurality of charging circuits is greater than the available power from the power source.

17. The system of claim 16, wherein the controller is further operable to:

output, in response to the amount of power needed by the plurality of charging circuits being less than the available power from the power source, the charging power to the plurality of charging circuits to charge the battery packs.

18. The system of claim 16, wherein the controller is further operable to:

determine that at least one of the plurality of battery packs has been removed from a corresponding battery pack receptacle;

receive at least one signal from a corresponding charging circuit, the at least one signal from the corresponding charging circuit being indicative of an amount of power released; and determine a new available power, the new available power is the amount of power released in combination with the available power.

19. The system of claim 16, wherein the at least one sensor is one of a voltage sensor and a current sensor.

20. The system of claim 16, wherein the power source is an alternating current (AC) power source.

\* \* \* \* \*